United States Patent [19]

Goodwin et al.

[11] Patent Number: 4,769,853
[45] Date of Patent: Sep. 6, 1988

[54] HIGH DYNAMIC RANGE FIBER OPTICAL LINK

[75] Inventors: Francis E. Goodwin, Burke, Va.; Gordon R. Orme, Rancho Palos Verdes; Peter G. Petrelis, Huntington Beach, both of Calif.

[73] Assignee: TRW Inc., Redondo Beach, Calif.

[21] Appl. No.: 113,369

[22] Filed: Oct. 23, 1987

Related U.S. Application Data

[63] Continuation of Ser. No. 749,339, Jun. 27, 1985, abandoned.

[51] Int. Cl.$^4$ ................................................ H04B 9/00
[52] U.S. Cl. ................................... 455/616; 332/7.51; 350/356; 350/384

[56] References Cited

U.S. PATENT DOCUMENTS

| | | | |
|---|---|---|---|
| 2,385,086 | 9/1945 | D'Agostino et al. | 455/615 |
| 2,531,951 | 11/1950 | Shamos et al. | 455/616 |
| 3,431,418 | 3/1969 | Stone | 455/616 |
| 3,675,022 | 7/1972 | Nelson et al. | 455/611 |
| 3,699,463 | 10/1972 | Stone | 455/615 |
| 3,752,992 | 8/1973 | Fluhr | 455/611 |
| 4,025,194 | 5/1977 | Teppo | 455/611 |

OTHER PUBLICATIONS

Malyon et al.–"PSK Homodyne Receiver"–Electronics Letters, Feb. 17, 1983, vol. 19, #4, pp. 144–146.
Thiess; *Proceedings of the I.E.E.E.;* "Method of Detecting Microwave Modulated Light," vol. 51; No. 6; p. 950; Jun. 1963.

Primary Examiner—Robert L. Griffin
Assistant Examiner—Andrew J. Telesz, Jr.
Attorney, Agent, or Firm—Noel F. Heal; Sol L. Goldstein

[57] ABSTRACT

Apparatus, and a corresponding method for its use, for modulating an optical carrier signal with a radio-frequency signal and providing a desirably high dynamic range. An optical signal source is split into a carrier signal and a reference signal, ideally with an optical star coupler, and the carrier signal is phase-modulated with the radio-frequency signal by means of a Pockels cell, producing a phase-modulated signal devoid of even-harmonic distortion, and containing only relatively small odd-harmonic components. In the preferred embodiment of the invention, the phase-modulated signal has its carrier signal suppressed. Then the resulting double-side-band suppressed-carrier signal is combined with the reference signal, preferably with another optical star coupler, to produce the desired modulated optical signal with high dynamic range.

7 Claims, 1 Drawing Sheet

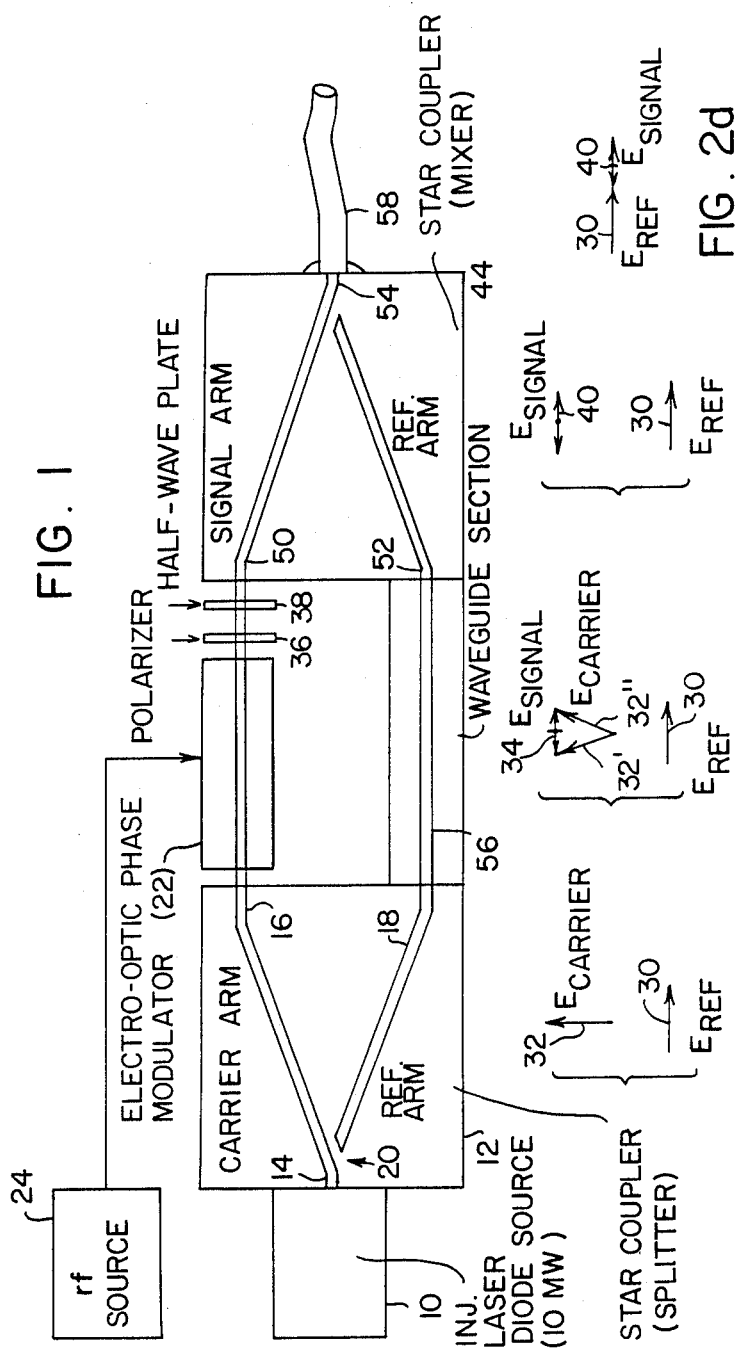

4,769,853

HIGH DYNAMIC RANGE FIBER OPTICAL LINK

This application is a continuation, of application Ser. No. 749,339, filed June 27, 1985 and now abandoned.

BACKGROUND OF THE INVENTION

This invention relates generally to fiber optical radio-frequency communication or data links, and more particularly, to those communication applications of optical fibers in which a high dynamic range is required. Dynamic range is analogous to a signal-to-noise ratio. In a practical environment, every radio communication signal is distorted by noise components derived from a variety of sources, and by harmonic distortion components at frequencies that are integral multiples of the signal frequency. Dynamic range may be defined as the ratio of the available signal power to the total power associated with noise and harmonic distortion components. Thus, a larger value of dynamic range is equivalent to a purer or less distorted signal.

Relatively high values of dynamic range are obtainable using conventional coaxial cable as a communication link, and transmitting the signal at radio frequencies. Typically, dynamic range values in excess of approximately 83 decibels (dB) are attainable in coaxial cables. However, there are some situations in which coaxial cables are unsuitable for various reasons. For example, if the required transmission distance of the link is too great, the advantage of coaxial cables is diminished by their high transmission losses, in comparison to low-loss optical fibers. Another example is an application that requires repeated flexing of the communication link, as in rotatable antennas. In this case, there may be mechanical problems, such as excessive mass, fatigue failure, and so forth, that dictate the use of optical fibers instead of coaxial cables. Susceptibility to electromagnetic interference (EMI) is yet another factor that may dictate the use of optical fibers instead of coaxial cables.

Use of a fiber optical link avoids many of these problems. Fibers are lighter in weight and immune to electromagnetic interference. They are also relatively resistant to fatigue failure due to repeated flexing. In a fiber optical communication link, a carrier signal at or near visible light frequencies is employed. In most applications of interest, the communication signal is available in the form of a modulated radio-frequency (rf) signal. For example, an rf signal may be received at an antenna and the application calls for transmitting it over optical fibers to a distant location. Accordingly, such applications require that an optical frequency carrier signal be modulated with an rf subcarrier signal, which in turn carries the communication signal. This invention is not concerned with the method of rf modulation that is used, except to the extent that some rf modulation techniques require a greater dynamic range than others.

The conventional technique for modulating an optical carrier signal source, such as an injection laser diode, is to bias the laser to a point in its operating characteristic above its lasing threshold, and to apply simultaneously a modulating (rf) signal. However, the resulting modulated signal includes a strong second harmonic component, as well as higher-order harmonics. The dynamic range is, therefore, relatively poor, only about 33 dB, compared with 83 dB for a typical coaxial cable.

It will be appreciated from the foregoing that there is a need for an alternative approach for the modulation of an optical beam in a fiber optical communication link. The present invention is directed to this end.

SUMMARY OF THE INVENTION

The present invention resides in a fiber optical communication link having a relatively high dynamic range, and a corresponding method for its operation. Briefly, and in general terms, the apparatus of the invention comprises a source of optical radition, signal dividing means for producing a reference signal and a carrier signal, and electro-optical phase modulation means, for modulating the carrier signal to produce a phase-modulated signal. The apparatus of the invention also includes means for removing the carrier signal from the phase-modulated signal, to produce a double-sideband suppressed-carrier signal, and means for adjusting the plane of polarization of this signal to match that of the reference signal. Finally, the apparatus includes signal combining means, for combining the adjusted double-sideband suppressed-carrier signal with the reference signal.

The combining means functions to mix or heterodyne the two signals. So long as the carrier-suppressed signal and the reference signal are matched in phase, the resulting modulated signal can be properly demodulated. Perhaps more important, is the result that the modulated signal that is output from the combining means contains no even-numbered harmonic components. Principally for this reason, the dynamic range of the link is relatively high, about 68 dB for the exemplary embodiment. While this is not as high as the dynamic range of a coaxial cable, it is 35 dB better than that of a conventional fiber optical link.

In the presently preferred embodiment of the invention, the signal dividing and combining means are optical star couplers, including diverging or converging optical waveguides fabricated as integral components. Alternatively, the optical signals can be divided and combined by appropriately fusing together twisted pairs of individual optical fibers.

An alternative approach to the one described is to omit the means for removing the carrier signal. The resulting signal is then not carrier-suppressed, and has to match the reference signal in amplitude, as well as phase, if proper demodulation is to be obtained.

The electro-optic phase modulator is preferably a Pockels cell operated in a pure phase-modulation mode. In the illustrative embodiment of the invention, the means for removing the carrier signal includes a polarizer, and the means for adjusting the plane of polarization of the carrier-suppressed signal includes a half-wave plate.

In accordance with the method of the invention, modulation of an optical carrier signal is achieved by the steps of dividing a coherent source of light into two approximately equal portions, referred to as a reference signal and a carrier signal, modulating the phase of the carrier signal with a radio-frequency signal, removing the carrier signal from the phase-modulated signal to provide a double-sideband suppressed-carrier signal, and adjusting the plane of polarization of the suppressed-carrier signal to match that of the reference signal. The final step is that of combining the reference signal and the adjusted suppressed-carrier signal, to provide a modulated reference signal that has a high dynamic range.

It will be appreciated from the foregoing that the present invention represents a significant advance in the field of fiber optical communication links. In particular, the invention provides a fiber optical communication link with a relatively high dynamic range. Other aspects and advantages of the invention will become apparent from the following more detailed description, taken in conjunction with the accompanying drawings.

BRIEF DESCRIPTION OF THE DRAWINGS

FIG. 1 is a simplified schematic view of a fiber optical communication link in accordance with the invention; and FIGS. 2a-2d are a series of phasor diagrams showing various signals at different stages of processing in the apparatus of FIG. 1.

DESCRIPTION OF THE PREFERRED EMBODIMENT

As shown in the drawings for purposes of illustration, the present invention is concerned with an improved technique for modulating an optical carrier signal for transmission through a fiber optical communication link. Although coaxial cables provide excellent dyanmic range characteristics, they may not be suitable in some communication applications, such as those involving long transmission distances, exposure to electromagnetic interference, or exposure to conditions of repeated mechanical flexing of the cables. Optical fibers are usually preferred for such applications, but the dynamic range provided by conventional optical fiber modulation techniques may not be high enough for analog applications, such as feed links for antenna arrays.

In accordance with the invention, an optical signal source is split into two portions, a reference signal and a carrier signal. Then the carrier signal is phase-modulated by a radio-frequency signal, and the phase-modulated signal is recombined with the reference signal, to provide a modulated signal that has a high dynamic range.

It will be understood that the term "optical signal" is not limited to radiation within the visible light portion of the spectrum. It may also include, for example, ultraviolet radiation.

As shown in FIG. 1, the apparatus of the invention includes an optical light source, indicated by reference numeral 10, which may be an injection laser diode. The laser diode 10 is coupled directly to an optical star coupler 12, a device having an input waveguide 14 and two integral output waveguides 16 and 18. As indicated at 20, the waveguides 14 and 16 are part of one continuous waveguide, while the other output waveguide 18 has an end portion in close proximity to the waveguide 14-16, at region 20. In the region 20, input energy is coupled in practically equal proportions to the output waveguides 16 and 18. The signal in the upper output waveguides 16 is referred to as the carrier signal, and the signal in the lower output waveguide 18 is referred to as the reference signal.

The carrier signal in the upper output waveguide 16 is coupled to an electro-optical phase modulator 22. In the preferred embodiment of the invention, this takes the form of a Pockels cell, such as a one-centimeter-long barium-strontium-niobate light pipe modulator with a 0.1 mm aperture. A radio-frequency (rf) signal source 24 is also applied to the phase modulator 22.

The phasor diagrams of FIGS. 2a-2d are all referenced to the phase of the reference signal. As shown in FIG. 2a, the phase of the reference signal is zero, indicated at 30 and that of the carrier signal is ninety degrees, as indicated at 32. This phase difference is designed into the waveguides 16 and 18, and, as will be seen, is needed to ensure that the reference signal is in the correct phase relationship to permit reconstruction of a suppressed carrier signal.

The effect of phase modulation is shown in FIG. 2b. The phase modulator 22 electrooptically modulates the phase of the carrier signal in accordance with the instantaneous amplitude of the rf signal source 24. The resulting composite signal may be considered to include a carrier-frequency component and components at upper and lower sideband frequencies above and below the carrier frequency. The bidirectional phasor 34 is intended to indicate these upper and lower sideband frequencies, which effectively rotate the carrier frequency phasor 32 to the postions shown at 32' and 32''. This phase-modulated signal is then applied to a polarizer 36, which effectively filters out the carrier signal component, Since the resulting double-sideband suppressed-carrier signal is in an orthogonal polarization to that of the reference signal, the plane of polarization is next rotated by ninety degrees, with a half-wave plate 38. The resultant signal is shown by the bidirectional phasor 40 in FIG. 2c. This signal is applied to one input port of a signal combiner 44, which is identical in structure to the star coupler 12 used as the signal divider, except that the combiner 44 has two input waveguides 50 and 52 and a single output waveguide 54. The double-sideband suppressed-carrier signal is applied to the input waveguide 50, and the original reference signal is transmitted through a waveguide 56 and then coupled to the other input waveguide 52. The output waveguide 54 is coupled to an output fiber 58, or to some other optical component. The phasor representation of the output signal is shown in FIG. 2d.

An alternative approach is to omit suppression of the carrier signal during phase modulation, i.e. to omit the polarizer 36 and the half-wave plate 38. In this alternative approach, the carrier signal contributes to the noise component in subsequent detection or demodulation. In effect, this approach results in a phase-modulated optical signal, and the reference signal must match the carrier signal in amplitude as well as phase for proper demodulation. Apart from these considerations, however, the alternative approach also operates to provide an improved dynamic range.

Improved dynamic range performance in both approaches is obtained principally because phase modulation results in the generation of no even harmonic components, and relatively small odd harmonic components, in the modulated signal. Thus the harmonic distortion component of the dynamic range ratio is relatively small, and the dynamic range is correspondingly large. The sideband power in the phase-modulated signal may be computed as the product of the square of the conventional small-angle phase modulation index and three times the source optical power. If the optical source 10 is assumed to have a power of 10 mW (milliwatts), half of which is transmitted as the carrier signal, and the drive power is assumed to be 1 mW, this computation yields a sideband power of approximately $10^{-4}$ watt. Corresponding computations of harmonic powers yield zero even harmonic powers and a third harmonic power of approximately $10^{-11}$ watt, or approximately 70 dB below the first harmonic power level.

In a conventionally modulated fiber optical link, the second harmonic component is only approximately 33 dB below the first harmonic, and the dynamic range suffers accordingly. This is the basis for the difference in performance between the conventional fiber optical link and the link of the present invention.

The following table compares the signal-to-noise ratios (S/N), signal-to-distortion ratios (S/D), and dynamic ranges for three communication links having 1 GHz (gigahertz) bandwidth and assuming 0 dBm input.

| Link Type | S/N | S/D | Dyn. Range |
|---|---|---|---|
| Conventional fiber optic | 63 dB | 33 dB | 33 dB |
| Phase-modulated fiber optic | 59 | 71 | 59 |
| Coaxial cable | 83 | infinite | 83 |

It will be appreciated from this table that the apparatus of the invention provides a dynamic range approximately 26 dB better than that of conventional fiber optical modulation techniques, but not as good as that of a coaxial cable link. However, the coaxial cable approach is not suitable for some applications, and the conventional fiber optical link may have insufficient dynamic range.

It will also be appreciated that, although one embodiment has been described in detail for purposes of illustration, various modifications may be made without departing from the spirit and scope of the invention. Accordingly, the invention is not to be limited except as by the appended claims.

We claim:

1. A fiber optical communications link, comprising:
   a source of monochromatic, coherent, optical radiation;
   signal dividing means, for producing a reference signal and a carrier signal;
   electro-optical phase modulation means, for modulating the carrier signal with a radio-frequency signal to produce a phase-modulated double-sideband signal;
   means for removing the carrier signal from the phase-modulated double-sideband signal, to produce a phase-modulated double-sideband suppressed-carrier signal;
   means for adjusting the plane of polarization of the phase-modulated double-sideband suppressed-carrier signal to match that of the reference signal; and
   signal combining means, for combining the phase-modulated polarization-adjusted double-sideband suppressed-carrier signal with the reference signal, to produce as an output a modulated optical signal with high dynamic range.

2. A fiber optical communication link as set forth in claim 1, wherein:
   the phase-modulation means includes a Pockels cell.

3. A fiber optical communication link as set forth in claim 1, wherein:
   the means for removing the carrier signal includes a polarizer.

4. A fiber optical communication link as set forth in claim 1, wherein:
   the means for adjusting the plane of polarization includes a half-wave plate.

5. A method for modulating an optical carrier signal, comprising the steps of:
   dividing a coherent source of light into two approximately equal portions, referred to as a reference signal and a carrier signal;
   modulating the phase of the carrier signal with a radio-frequency signal;
   removing the carrier signal from the phase-modulated signal to provide a phase-modulated double-sideband suppressed-carrier signal;
   adjusting the plane of polarization of the phase-modulated double-sideband suppressed-carrier signal to match that of the reference signal;
   combining the reference signal and the phasemodulated polarization-adjusted double-sideband suppressed-carrier signal; and
   providing, as a result of the combining step, a modulated optical signal that has a high dynamic range.

6. A fiber optical communications link, comprising:
   a source of monochromatic, electromagnetic radiation;
   signal dividing means, for producing a reference signal and a carrier signal;
   electro-optical phase modulation means, for modulating the carrier signal with an information signal to produce a phase-modulated double-sideband signal;
   means for removing the carrier signal from the phase-modulated double-sideband signal, to produce a phase-modulated double-sideband suppressed-carrier signal;
   means for adjusting the plane of polarization of the phase-modulated double-sideband suppressed-carrier signal to match that of the reference signal;
   signal combining means, for combining the phase-modulated, polarization-adjusted double-sideband suppressed-carrier signal with the reference signal, to produce as an output a modulated electromagnetic signal with high dynamic range.

7. A method for modulating an optical carrier signal, comprising the steps of:
   dividing a source of optical radiation which is not limited to the visible spectrum, into two portions, referred to as a reference signal and a carrier signal;
   electro-optically modulating the phase of the carrier signal with an information signal to produce a phase-modulated double-sideband signal;
   removing the carrier signal from the phase-modulated double-sideband signal to provide a phase-modulated double-sideband suppressed-carrier signal;
   adjusting the plane of polarization of the phase-modulated double-sideband suppressed-carrier signal to match that of the reference signal;
   combining the reference signal and the phasemodulated polarization-adjusted double-sideband suppressed-carrier signal; and
   providing, as a result of the combining step, a modulated electromagnetic signal that has a high dynamic range.

* * * * *